March 31, 1953     S. P. KISH     2,632,922
METHOD OF MAKING REPRODUCTION FIXTURES
Filed Sept. 27, 1949
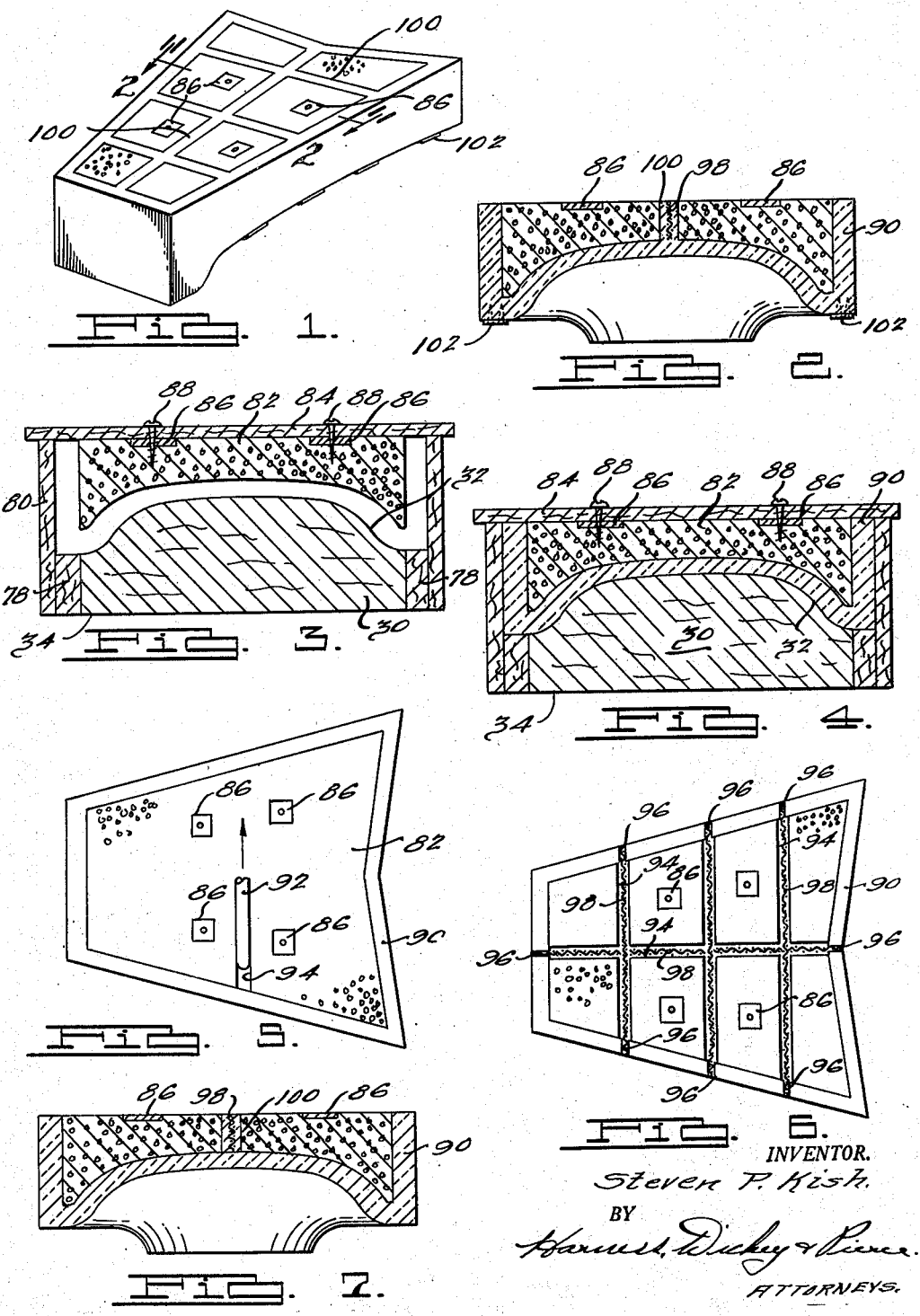
INVENTOR.
Steven P. Kish.
BY
Harness, Dickey & Pierce
ATTORNEYS.

Patented Mar. 31, 1953

2,632,922

UNITED STATES PATENT OFFICE 2,632,922

METHOD OF MAKING REPRODUCTION FIXTURES

Steven P. Kish, Lansing, Mich., assignor to Kish Plastic Products, Inc., Lansing, Mich., a corporation of Michigan Application September 27, 1949, Serial No. 118,113

4 Claims. (Cl. 18—59)

This invention relates broadly to new and useful improvements in surface-reproduction fixtures such as female duplications, checking fixtures, spotting fixtures, and the like.

An important object of the present invention is to provide an improved method of making surface-reproduction fixtures of the above-mentioned character.

Another object of the invention is to provide an improved method of making a surface-reproduction fixture which is strong and rigid, light in weight, and weather-resistant.

Still another object of the invention is to provide an improved method which permits reproduction fixtures to be made faster and less expensively than heretofore.

Other objects and advantages of the invention will be apparent during the course of the following description.

In the drawings forming a part of this specification and wherein like numerals are employed to designate like parts throughout the same:

Fig. 1 is a perspective view showing the reproduction fixture embodying the invention;

Fig. 2 is a transverse, sectional view taken on the line 2—2 of Fig. 1;

Fig. 3 is a transverse, sectional view showing the first step in making the fixture of Fig. 1;

Fig. 4 is a transverse, sectional view similar to Fig. 3 but showing the second step in making the fixture;

Fig. 5 is a top plan view showing the third step in making the fixture;

Fig. 6 is a top plan view similar to Fig. 5 but showing the fourth step in making the fixture; and Fig. 7 is a transverse, sectional view showing the fifth and last step in making the fixture.

In the drawings, I show a modified female reproduction fixture that can be adapted for use as a checking fixture. The structure and method of forming the instant fixture is described in detail.

The model 30 is here used by way of illustration. The model 30 is built up at the sides and ends by spacer strips 78, and a generally rectangular form 80 is employed around the model 30. A solid core 82 of expanded polystyrene is supported above the model by transverse strips 84 as perhaps best shown in Figs. 3 and 4. In this form of the invention inserts 86 of wood or the like are provided in the top surface of the core 82 and the latter is fastened to the supporting strips 84 by screws 88. It will be observed that the screws 88 penetrate the inserts 86 which provide a better matrix than the polystyrene 82 for holding the screws. Also it will be observed that the core 82 conforms generally to the top surface of the model 30 and that the core is spaced from the model and from the form 80.

After the core 82 is properly suspended above the model as shown in Fig. 3, a hardenable plastic material 90 is introduced into the space between the core and the mold. Any hardenable plastic materials of the type hereinabove described may be employed. Plastic material may be introduced from below or it can be merely poured into the mold from above. When the mold is entirely filled with the plastic material 90, the latter is permitted to set or harden. If a thermosetting resin is used, the mold is placed in an oven or in any other suitable environment which will cause the resin to harden or set relatively rapidly. If an acid-setting resin is employed it will set or harden relatively rapidly at room temperature shortly after it has been poured into the mold. The resin used in any particular instance may vary considerably, depending upon the size and shape of the model and upon the particular use for which the fixture is intended. Resins of the type here referred to as suitable for the purpose of this invention are conventional and well known to the art.

After the resin 90 has set, the fixture is separated from the model 30 and from the core box 80 and supporting strips 84. In the case of large fixtures of the type here shown, the essentially thin plastic shell produced by the above step is not adequately strong and rigid to hold its shape within the necessary tolerance. In this connection it should be remembered that it is essential to maintain the shell 90 essentially thin so that any shrinkage which might occur when the plastic material sets will be insignificant.

According to the present invention the fixture is strengthened and reinforced by cutting longitudinal and transverse grooves in the polystyrene core 82. This may be done conveniently by pressing a heated iron 92 along the top surface of the core, as shown in Fig. 5. The heated iron readily penetrates the core all the way to the plastic shell 90 and easily and quickly burns neat channels 94 all the way across the core. Strengthening and reinforcing bars are then placed in the channels 94 and the ends of the bars are fastened solidly to opposite sides of the shell 90. These bars greatly strengthen the shell transversely and prevent it from twisting or warping in use. While any type or kind of reinforcing bar may be used, I prefer to make the bars of plastic, since this procedure is most convenient and least expensive; moreover, it permits the bars to be formed and simultaneously fastened to the shell 90. To this end, saw cuts 96 or the like are then made in the side walls of shell 90 in alignment with channels 94, and reinforcing strips 98 of screen wire or the like are placed in the channels. Plastic material 100 preferably similar to that employed for the shell 90 is then placed in the channels 94. The plastic 100 in channels 94 integrally unites with the plastic shell 90 and forms longitudinal and transverse ribs which strengthen and reinforce the shell. If desired, a plurality of small metal blocks 102 can be fastened to the undersurface of the fixture to define the trim lines as in the model described in connection with the first form of the invention.

The final product thus produced will maintain its form within the required tolerance under essentially all conditions of use. It is strong, rigid, and light in weight. Moreover, it can be manufactured easily and quickly and relatively inexpensively. In short, the instant construction possesses substantially all of the advantages inherent in the forms of the invention previously described.

If desired, the core material 82 can be removed from the individual cells thus formed in the back surface of the fixture by dissolving it with acetone or any other well-known solvent for this material. In this manner the polystyrene can be completely removed. Such removal of the core material lightens the fixture very little but it may be desirable in case it is desired to adapt the female reproduction for use as a checking or spotting fixture. It will be readily apparent that this can be accomplished by cutting out sections of the shell 90 in areas bounded by the strengthening and reinforcing ribs 100 as in the form of the invention first described.

Having thus described the invention, I claim:

1. The method of making a surface-reproduction fixture comprising confining the surface to be reproduced; suspending a core of dimensionally stable, lightweight, rigid, expanded plastic material above said surface; filling the space between said core and the surface to be reproduced and the space around said core with hardenable plastic material having substantially the same coefficient of thermal expansion as the material of the core to produce a plastic shell on said core; hardening said plastic material; then forming channels in said core, which channels extend entirely across the core both longitudinally and transversely, filling said channels with additional hardenable plastic material; and then hardening said plastic material in said channels to provide longitudinal and transverse reinforcing ribs bonded to and integrated with said shell.

2. The method of making a surface-reproduction fixture comprising confining the surface to be reproduced; suspending a dimensionally stable, lightweight, rigid core of expanded plastic material above said surface; filling the space between the core and said surface and the space around said core with a hardenable plastic material having substantially the same coefficient of thermal expansion as the material of the core; hardening said plastic material, then channeling said core transversely and longitudinally, filling said channels with additional hardenable plastic material; and then hardening the plastic material in said channels.

3. The method of making a surface-reproduction fixture comprising making a model of said surface; forming a mold from said model; suspending a core of dimensionally stable, lightweight, rigid, expanded plastic material in said mold with the undersurface thereof spaced from the bottom of the mold and with the sides thereof spaced from the side walls of the mold; pouring a hardenable plastic material having substantially the same coefficient of thermal expansion as the material of the core into the space between the core and the mold; hardening said plastic material; thereafter forming channels in the top surface of said core which extend from one side to the other thereof; and then pouring hardenable plastic material in said channels to provide ribs which strengthen and reinforce the plastic shell.

4. The method of making a surface-reproduction fixture comprising making a model of said surface; forming a mold from said model, suspending a core of dimensionally stable, expanded plastic material in said mold with the undersurface thereof spaced from the bottom of the mold and with the sides thereof spaced from the side walls of the mold; pouring a hardening plastic material having substantially the same coefficient of thermal expansion as the material of the core into the space between the core and the mold to form a shell on the core, which shell accurately reproduces said surface in negative form; hardening said plastic material, then forming channels in the top surface of said core, which channels extend from one side to the other of the core, and then placing strengthening and reinforcing ribs in said channels and fastening the ribs at the ends thereof to said shell.

STEVEN P. KISH.

REFERENCES CITED

The following references are of record in the file of this patent:

UNITED STATES PATENTS

| Number | Name | Date |
| --- | --- | --- |
| 1,863,799 | Loetscher | June 21, 1932 |
| 2,202,683 | Baesgen | May 28, 1940 |
| 2,284,929 | Stewart | June 2, 1942 |
| 2,371,047 | Groehn | Mar. 6, 1945 |
| 2,434,372 | Stewart | Jan. 13, 1948 |
| 2,459,084 | McGary | Jan. 11, 1949 |
| 2,460,242 | Renaud | Jan. 25, 1949 |
| 2,480,048 | Rice | Aug. 23, 1949 |
| 2,497,009 | Minuto | Feb. 7, 1950 |
| 2,516,091 | Renaud | July 18, 1950 |

OTHER REFERENCES

"Styrofoam," Dow Chemical Co., 1947, pages 2 and 3.